United States Patent
Prasad et al.

(10) Patent No.: US 7,581,131 B1
(45) Date of Patent: Aug. 25, 2009

(54) METHOD AND SYSTEM FOR BALANCING CLOCK TREES IN A MULTI-VOLTAGE SYNCHRONOUS DIGITAL ENVIRONMENT

(75) Inventors: V. V. Shyam Prasad, Bangalore (IN); Ganapathi Hegde, Bangalore (IN)

(73) Assignee: National Semiconductor Corporation, Santa Clara, CA (US)

( * ) Notice: Subject to any disclaimer, the term of this patent is extended or adjusted under 35 U.S.C. 154(b) by 468 days.

(21) Appl. No.: 11/124,820

(22) Filed: May 9, 2005

(51) Int. Cl.
G06F 1/12 (2006.01)
G06F 13/42 (2006.01)
H04L 5/00 (2006.01)
H04L 7/00 (2006.01)
(52) U.S. Cl. .................. 713/401; 713/400; 713/600
(58) Field of Classification Search ............. 713/400, 713/401, 600
See application file for complete search history.

(56) References Cited

U.S. PATENT DOCUMENTS

| | | | | |
|---|---|---|---|---|
| 5,422,915 A * | 6/1995 | Byers et al. | ............ | 375/357 |
| 5,570,397 A * | 10/1996 | Kubista | ............ | 375/356 |
| 5,742,798 A * | 4/1998 | Goldrian | ............ | 713/400 |
| 6,005,428 A * | 12/1999 | Amdahl | ............ | 327/161 |
| 6,114,877 A * | 9/2000 | Brown et al. | ............ | 326/96 |
| 6,115,827 A * | 9/2000 | Nadeau-Dostie et al. | .... | 713/503 |
| 6,340,905 B1 * | 1/2002 | Schultz | ............ | 327/161 |
| 6,751,786 B2 * | 6/2004 | Teng et al. | ............ | 716/18 |
| 6,792,554 B2 * | 9/2004 | Gervais et al. | ............ | 713/600 |
| 6,986,116 B2 * | 1/2006 | Fry et al. | ............ | 716/6 |
| 7,043,653 B2 * | 5/2006 | Kuhn et al. | ............ | 713/401 |
| 7,092,313 B2 * | 8/2006 | Terazawa et al. | ............ | 365/233 |
| 2001/0043098 A1 * | 11/2001 | Locker et al. | ............ | 327/156 |
| 2003/0033551 A1 * | 2/2003 | Kuhn et al. | ............ | 713/401 |
| 2004/0145397 A1 * | 7/2004 | Lutkemeyer | ............ | 327/158 |
| 2004/0202253 A1 * | 10/2004 | Hanibuchi | ............ | 375/257 |
| 2005/0050497 A1 * | 3/2005 | Tetelbaum | ............ | 716/6 |
| 2005/0111572 A1 * | 5/2005 | Kuroda et al. | ............ | 375/295 |
| 2005/0147178 A1 * | 7/2005 | Kikuchi | ............ | 375/288 |
| 2006/0061401 A1 * | 3/2006 | Shiratake et al. | ............ | 327/291 |
| 2006/0220721 A1 * | 10/2006 | Vig et al. | ............ | 327/261 |
| 2006/0222125 A1 * | 10/2006 | Edwards et al. | ............ | 375/354 |

* cited by examiner

*Primary Examiner*—Thomas Lee
*Assistant Examiner*—Jaweed A Abbaszadeh

(57) ABSTRACT

A method for balancing clock trees in a multi-voltage synchronous digital environment is provided that includes generating a first source clock signal in a first voltage domain based on a first mirrored clock signal in a second voltage domain. Similarly, a second source clock signal is generated in the second voltage domain based on a second mirrored clock signal in the first voltage domain.

21 Claims, 4 Drawing Sheets

METHOD AND SYSTEM FOR BALANCING CLOCK TREES IN A MULTI-VOLTAGE SYNCHRONOUS DIGITAL ENVIRONMENT

TECHNICAL FIELD OF THE INVENTION

The present invention relates generally to multi-voltage synchronous digital systems and, more particularly, to a method and system for balancing clock trees in a multi-voltage synchronous digital environment.

BACKGROUND OF THE INVENTION

In multi-voltage synchronous digital systems, clock tree latencies may be affected by voltage variations between the different voltage environments. When multiple clock trees are sourced by independent, varying voltages, the latency of each clock tree changes with its voltage. This results in imbalanced clock trees. In synchronous designs, this imbalance in the clock tree latencies can result in a timing violation across the clock domains.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future, uses of such defined words and phrases.

BRIEF-DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged multi-voltage synchronous digital system.

Figure 1:
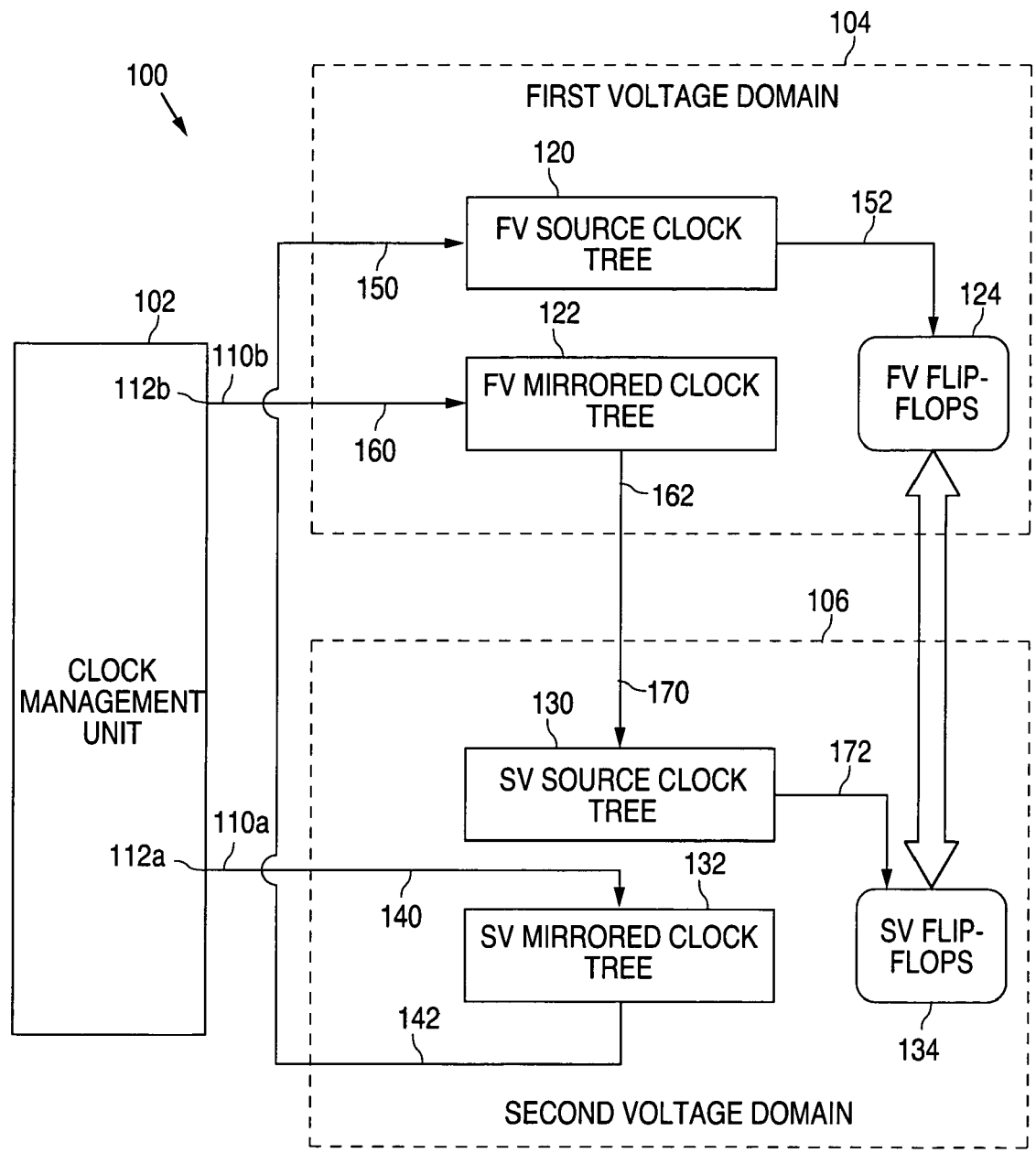
FIG. 1 is a block diagram illustrating a multi-voltage synchronous digital system operable to provide balanced clock trees in accordance with one embodiment of the present invention.

FIG. 1 is a block diagram illustrating a multi-voltage synchronous digital system 100 operable to provide balanced clock trees in accordance with one embodiment of the present invention. The system 100 comprises a clock management unit 102, a first voltage domain 104, and a second voltage domain 106.

The clock management unit 102 is coupled to the first and second voltage domains 104 and 106 and is operable to generate a first clock signal 110a and a second clock signal lob. For one embodiment, the first and second clock signals 110a and 110b may comprise essentially the same, original clock signal 110 provided at two different ports 112a and 112b, respectively, of the clock management unit 102.

For a particular embodiment of the present invention, the first voltage domain 104 comprises an adaptive voltage scaling (AVS) voltage domain and the second voltage domain 106 comprises a non-AVS voltage domain. For this embodiment, the first voltage domain 104 operates on a varying voltage, while the second voltage domain 106 operates on a relatively constant voltage. However, it will be understood that the voltage domains 104 and 106 may comprise any suitable types of voltage domains, either or both of which may operate on a varying voltage, without departing from the scope of the present invention.

The first voltage domain 104 is coupled to the second voltage domain 106 and comprises a first-voltage (FV) source clock tree 120, an FV mirrored clock tree 122, and a plurality of FV flip-flops 124. Similarly, the second voltage domain 106 comprises a second-voltage (SV) source clock tree 130, an SV mirrored clock tree 132, and a plurality of SV flip-flops 134. The FV flip-flops 124 and the SV flip-flops 134 are operable to communicate with each other. However, the FV flip-flops 124 are clocked by the FV source clock tree 120, which operates in the first voltage domain 104, while the SV flip-flops 134 are clocked by the SV source clock tree 130, which operates in the second voltage domain 106.

The FV mirrored clock tree 122 is essentially a copy of the FV source clock tree 120, and the SV mirrored clock tree 132 is essentially a copy of the SV source clock tree 130. As described in more detail below, the original clock signal 110 goes through the SV mirrored clock tree 132 before going through the FV source clock tree 120 and goes through the FV mirrored clock tree 122 before going through the SV source clock tree 130. As a result, the source clock trees 120 and 130 are able to clock the flip-flops 124 and 134, respectively, with essentially the same delays compared to the original clock signal 110 as each other.

In operation, according to a particular embodiment, the clock management unit 102 provides the first clock signal 110a to the second voltage domain 106. The SV mirrored clock tree 132 receives an SV mirrored clock tree (MCT) input signal 140 based on the first clock signal 110a and generates an SV MCT output signal 142 based on the SV MCT input signal 140. The FV source clock tree 120 receives an FV source clock tree (SCT) input signal 150 based on the SV MCT output signal 142 and generates an FV SCT output signal 152 based on the FV SCT input signal 150. The FV source clock tree 120 then clocks the FV flip-flops 124 using the FV SCT output signal 152.

Similarly, the clock management unit 102 provides the second clock signal 110b to the first voltage domain 104. The FV mirrored clock tree 122 receives an FV MCT input signal 160 based on the second clock signal 110b and generates an FV MCT output signal 162 based on the FV MCT input signal 160. The SV source clock tree 130 receives an SV SCT input signal 170 based on the FV MCT output signal 162 and generates an SV SCT output signal 172 based on the SV SCT input signal 170. The SV source clock tree 130 then clocks the SV flip-flops 134 using the SV SCT output signal 172.

It will be understood that, for some embodiments, one or both of the signals 110a and 140 and the signals 110b and 160 may comprise the same signal without departing from the scope of the present invention.

As a result of the differing voltages in the two voltage domains 104 and 106, the delays provided through the source clock trees 120 and 130 may be slightly different from each other. Because of this, the clock signals 110a and 110b generated by the clock management unit 102 are passed through the mirrored clock trees 132 and 122, respectively, in addition to the source clock trees 120 and 130, before being fed to the flip-flops 124 and 134. This ensures that the delay of each of the clock signals 110a and 110b is the same, within an acceptable margin of error, upon reaching the flip-flops 124 and 134, respectively, thereby allowing the FV flip-flops 124 and the SV flip-flops 134 to communicate with each other without timing violations.

Figure 2:
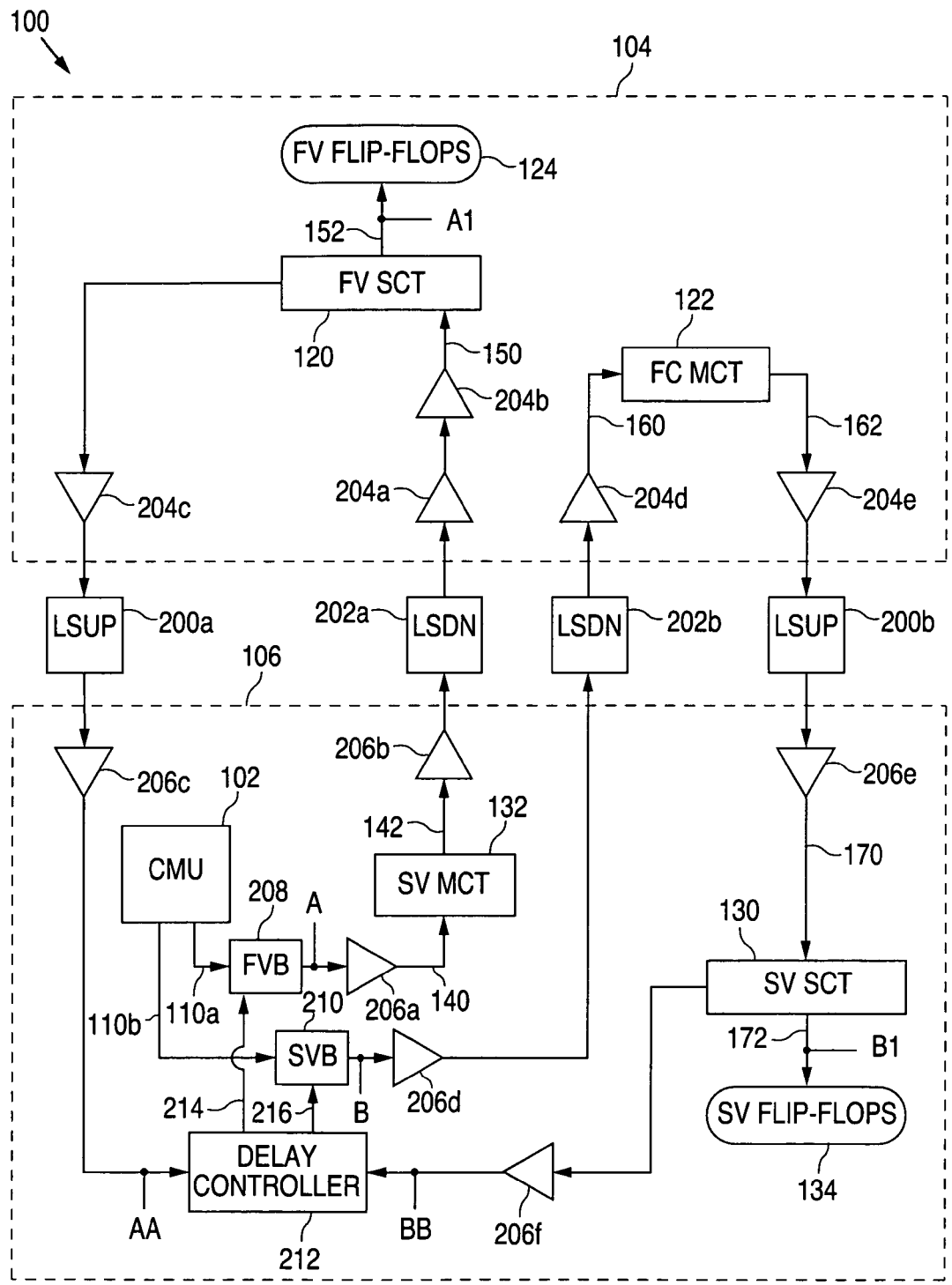
FIG. 2 is a block diagram illustrating the system of FIG. 1 in accordance with a first particular embodiment of the present invention.
Figure 3:
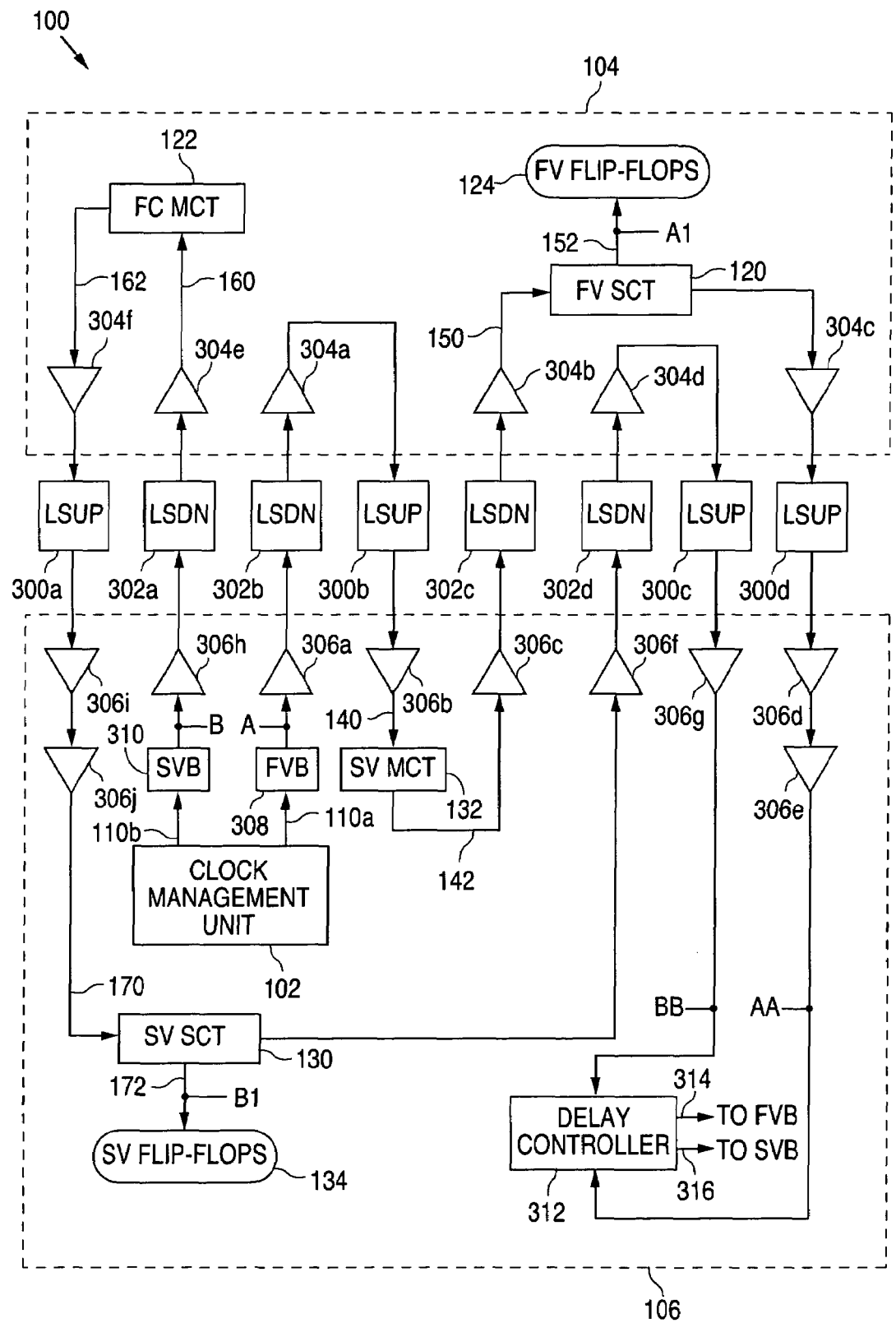
FIG. 3 is a block diagram illustrating the system of FIG. 1 in accordance with a second particular embodiment of the present invention.

FIGS. 2 and 3 are block diagrams illustrating the multi-voltage synchronous digital system 100 in accordance with first and second particular embodiments of the present invention, respectively. However, it will be understood that the system 100 may be otherwise suitably implemented without departing from the scope of the present invention. In addition, although the clock management unit 102 is illustrated in the second voltage domain 106, it will be understood that the clock management unit 102 may be implemented externally to both voltage domains 104 and 106 without departing from the scope of the present invention.

The system 100 illustrated in FIG. 2 comprises a plurality of level shifters 200 and 202, a plurality of buffers 204, 206, 208 and 210 and a delay controller 212, in addition to the components illustrated in FIG. 1. The level shifters 200a-b comprise level shifters up (LSUP), and the level shifters 202a-b comprise level shifters down (LSDN). The buffers 204a-e are in the first voltage domain 104. The buffers 206a-f, the first voltage buffer (FVB) 208, and the second voltage buffer (SVB) 210, as well as the delay controller 212, are in the second voltage domain 106.

Each LSUP 200 is operable to shift the voltage level at its input, which corresponds to a particular logic value in the first voltage domain 104, up to a higher voltage level at its output, which corresponds to the same logic value in the second voltage domain 106. Similarly, each LSDN 202 is operable to shift the voltage level at its input, which corresponds to a particular logic value in the second voltage domain 106, down to a lower voltage level at its output, which corresponds to the same logic value in the first voltage domain 104. It will be understood that the LSUPs 200 and the LSDNs 202 may be exchanged with each other for embodiments in which the first voltage domain 104 operates at a higher voltage level than the second voltage domain 106.

The first voltage buffer 208 comprises a controllable delay chain of buffers on the path from the clock management unit (CMU) 102 to the FV flip-flops 124, and the second voltage buffer 210 comprises a controllable delay chain of buffers on the path from the clock management unit 102 to the SV flip-flops 134. The delays provided by these buffers 208 and 210 are controlled by the delay controller 212. The delay controller 212 is operable to receive feedback signals, as indicated at points AA and BB, from the source clock trees 120 and 130. The delay controller 212 is also operable to provide control signals 214 and 216 based on the feedback signals to the buffers 208 and 210, respectively, in order to control the delays provided by the buffers 208 and 210. Thus, the delay controller 212 is able to provide a fine-tuning mechanism for adjusting slight delays in the system 100.

In operation, according to a particular embodiment, the clock management unit 102 provides the first clock signal 110a to the first voltage buffer 208. The delayed clock signal is then provided to buffer 206a, which outputs the SV MCT input signal 140 to the SV mirrored clock tree 132. The SV mirrored clock tree 132, which is substantially a copy of the SV source clock tree 130, generates the SV MCT output signal 142 based on the SV MCT input signal 140.

The SV MCT output signal 142 is provided to buffer 206b, which provides an output to LSDN 202a. LSDN 202a then down-shifts the voltage level of the signal and provides the shifted signal to buffers 204a and 204b, which output the FV SCT input signal 150 to the FV source clock tree 120. The FV source clock tree 120 then generates the FV SCT output signal 152 based on the FV SCT input signal 150 and clocks the FV flip-flops 124 using the FV SCT output signal 152.

The FV source clock tree 120 also sends a signal through buffer 204c to LSUP 200a, which up-shifts the voltage level of the signal and provides the shifted signal to buffer 206c. Buffer 206c outputs a first voltage feedback signal, as indicated at point AA, to the delay controller 212.

Similarly, the clock management unit 102 provides the second clock signal 110b to the second voltage buffer 210. The delayed clock signal is then provided to buffer 206d, which outputs the signal to LSDN 202b. LSDN 202b then down-shifts the voltage level of the signal and provides the shifted signal to buffer 204d, which outputs the FV MCT input signal 160 to the FV mirrored clock tree 122. The FV mirrored clock tree 122, which is substantially a copy of the FV source clock tree 120, generates the FV MCT output signal 162 based on the FV MCT input signal 160.

The FV MCT output signal 162 is provided to buffer 204e, which provides an output to LSUP 200b. LSUP 200b then up-shifts the voltage level of the signal and provides the shifted signal to buffer 206e, which outputs the SV SCT input signal 170 to the SV source clock tree 130. The SV source clock tree 130 then generates the SV SCT output signal 172 based on the SV SCT input signal 170 and clocks the SV flip-flops 134 using the SV SCT output signal 172.

The SV source clock tree 130 also sends a signal through buffer 206f, which outputs a second voltage feedback signal, as indicated at point BB, to the delay controller 212. The delay controller 212 controls the delays provided by the buffers 208 and 210 by generating the control signals 214 and 216 based on the feedback signals received at points AA and BB. Thus, the delay controller 212 provides a fine-tuning mechanism for adjusting slight delays in the system 100.

For the path from the point marked A, after the first voltage buffer 208, to the point marked A1, at the output of the FV source clock tree 120, there is a specific delay. Similarly, for the path from the point marked B, after the second voltage buffer 210, to the point marked B1, at the output of the SV source clock tree 130, there is another specific delay. The difference between these two delays is essentially determined by the delay through one LSUP 200.

The system 100 illustrated in FIG. 3 comprises a plurality of level shifters 300 and 302, a plurality of buffers 304, 306, 308 and 310 and a delay controller 312, in addition to the components illustrated in FIG. 1. The level shifters 300a-d comprise level shifters up (LSUP), and the level shifters 302a-d comprise level shifters down (LSDN). The buffers 304a-f are in the first voltage domain 104. The buffers 306a-j, the first voltage buffer (FVB) 308, and the second voltage buffer (SVB) 310, as well as the delay controller 312, are in the second voltage domain 106.

Each LSUP 300 is operable to shift the voltage level at its input, which corresponds to a particular logic value in the first voltage domain 104, up to a higher voltage level at its output, which corresponds to the same logic value in the second voltage domain 106. Similarly, each LSDN 302 is operable to shift the voltage level at its input, which corresponds to a particular logic value in the second voltage domain 106, down to a lower voltage level at its output, which corresponds to the same logic value in the first voltage domain 104. It will be understood that the LSUPs 300 and the LSDNs 302 may be exchanged with each other for embodiments in which the first voltage domain 104 operates at a higher voltage level than the second voltage domain 106.

The first voltage buffer 308 comprises a controllable delay chain of buffers on the path from the clock management unit 102 to the FV flip-flops 124, and the second voltage buffer 310 comprises a controllable delay chain of buffers on the path from the clock management unit 102 to the SV flip-flops 134. The delays provided by these buffers 308 and 310 are controlled by the delay controller 312. The delay controller 312 is operable to receive feedback signals, as indicated at points AA and BB, from the source clock trees 120 and 130. The delay controller 312 is also operable to provide control signals 314 and 316 based on the feedback signals to the buffers 308 and 310, respectively, in order to control the delays provided by the buffers 308 and 310. Thus, the delay controller 312 is able to provide a fine-tuning mechanism for adjusting slight delays in the system 100.

In operation, according to a particular embodiment, the clock management unit 102 provides the first clock signal 110a to the first voltage buffer 308. The delayed clock signal is then provided to buffer 306a, which outputs a signal to LSDN 302b. LSDN 302b then down-shifts the voltage level of the signal and provides the shifted signal to buffer 304a, which outputs a signal to LSUP 300b. LSUP 300b then up-shifts the voltage level of the signal and provides the shifted signal to buffer 306b, which outputs the SV MCT input signal 140 to the SV mirrored clock tree 132. The SV mirrored clock tree 132, which is substantially a copy of the SV source clock tree 130, generates the SV MCT output signal 142 based on the SV MCT input signal 140.

The SV MCT output signal 142 is provided to buffer 306c, which provides an output to LSDN 302c. LSDN 302c then down-shifts the voltage level of the signal and provides the shifted signal to buffer 304b, which outputs the FV SCT input signal 150 to the FV source clock tree 120. The FV source clock tree 120 then generates the FV SCT output signal 152 based on the FV SCT input signal 150 and clocks the FV flip-flops 124 using the FV SCT output signal 152.

The FV source clock tree 120 also sends a signal through buffer 304c to LSUP 300d, which up-shifts the voltage level of the signal and provides the shifted signal to buffers 306d and 306e. Buffers 306d and 306e output a first voltage feedback signal, as indicated at point AA, to the delay controller 312.

Similarly, the clock management unit 102 provides the second clock signal 1ob to the second voltage buffer 310. The delayed clock signal is then provided to buffer 306h, which outputs the signal to LSDN 302a. LSDN 302a then down-shifts the voltage level of the signal and provides the shifted signal to buffer 304e, which outputs the FV MCT input signal 160 to the FV mirrored clock tree 122. The FV mirrored clock tree 122, which is substantially a copy of the FV source clock tree 120, generates the FV MCT output signal 162 based on the FV MCT input signal 160.

The FV MCT output signal 162 is provided to buffer 304f, which provides an output to LSUP 300a. LSUP 300a then up-shifts the voltage level of the signal and provides the shifted signal to buffers 306i and 306j, which output the SV SCT input signal 170 to the SV source clock tree 130. The SV source clock tree 130 then generates the SV SCT output signal 172 based on the SV SCT input signal 170 and clocks the SV flip-flops 134 using the SV SCT output signal 172.

The SV source clock tree 130 also sends a signal through buffer 306f, which outputs a signal to LSDN 302d. LSDN 302d then down-shifts the voltage level of the signal and provides the shifted signal to buffer 304d, which outputs a signal to LSUP 300c. LSUP 300c then up-shifts the voltage level of the signal and provides the shifted signal to buffer 306g, which outputs a second voltage feedback signal, as indicated at point BB, to the delay controller 312. The delay controller 312 controls the delays provided by the buffers 308 and 310 by generating the control signals 314 and 316 based on the feedback signals received at points AA and BB. Thus, the delay controller 312 provides a fine-tuning mechanism for adjusting slight delays in the system 100.

For the path from the point marked A, after the first voltage buffer 308, to the point marked A1, at the output of the FV source clock tree 120, there is a specific delay. Similarly, for the path from the point marked B, after the second voltage buffer 310, to the point marked B1, at the output of the SV source clock tree 130, there is another specific delay. The difference between these two delays is essentially determined by the delay through one LSDN 302.

Figure 4:
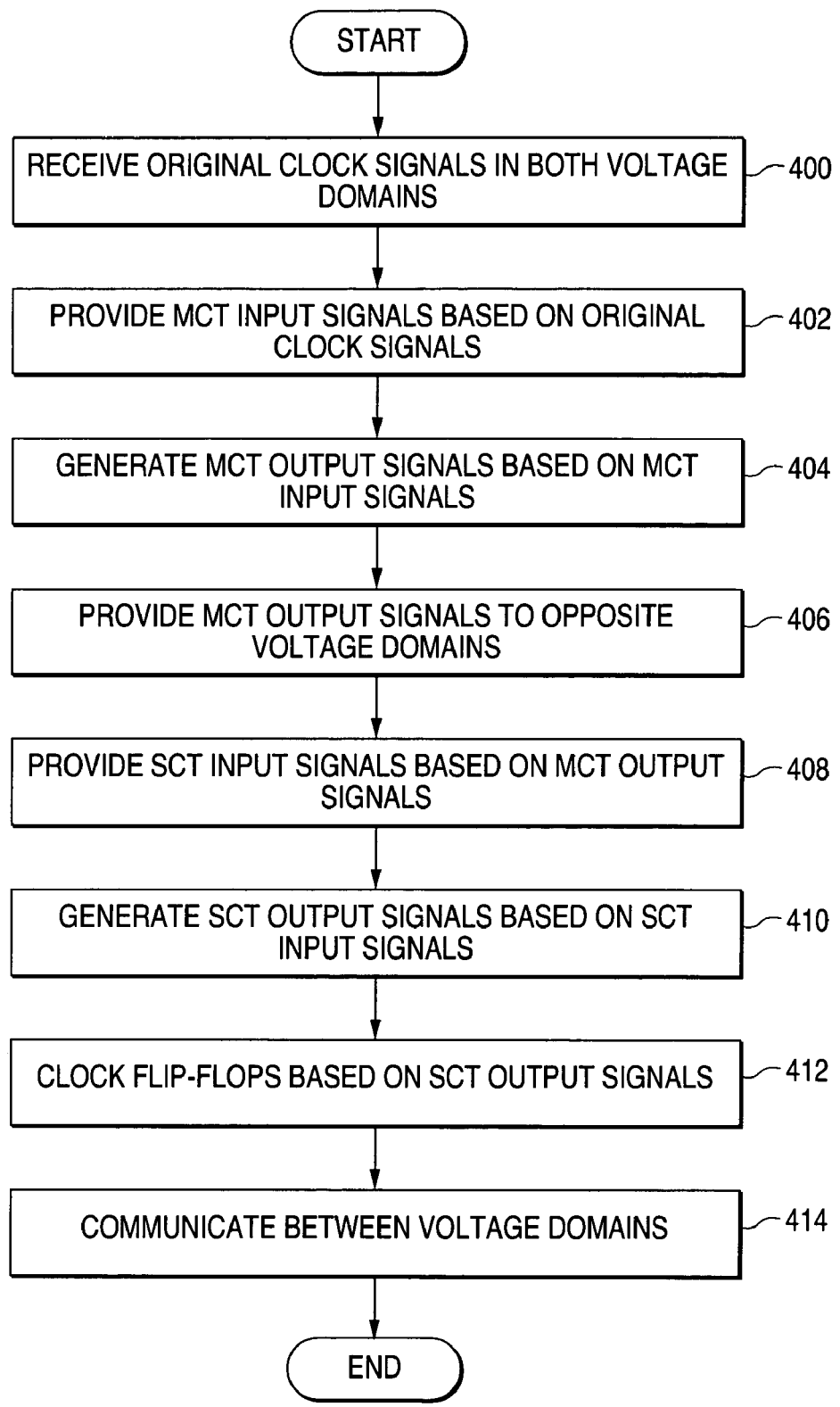
FIG. 4 is a flow diagram illustrating a method for balancing clock trees in the system of FIG. 1 in accordance with one embodiment of the present invention.

FIG. 4 is a flow diagram illustrating a method for balancing clock trees in the multi-voltage synchronous digital system 100 in accordance with one embodiment of the present invention. The method begins at step 400 where original clock signals 110a and 110b are received in the second voltage domain 106 and the first voltage domain 104, respectively. With respect to the following description, it will be understood that signals in the first voltage domain 104 are processed and/or generated by the components in the first voltage domain 104, while signals in the second voltage domain 106 are processed and/or generated by the components in the second voltage domain 106.

At step 402, MCT input signals 140 and 160 are provided based on the original signals 110a and 110b to the mirrored clock trees 132 and 122. At step 404, the mirrored clock trees 132 and 122 generate MCT output signals 142 and 162 based on the MCT input signals 140 and 160. In this way, delays to the original clock signals 110a and 110b are introduced by the mirrored clock trees 132 and 122 that are essentially equivalent to the delays introduced by the source clock trees 130 and 120.

At step 406, the MCT output signals 142 and 162 are provided to the first and second voltage domains 104 and 106, which are the opposite of the voltage domains 106 and 104 in which those signals 142 and 162 were generated. In being provided from one voltage domain 104 or 106 to the other voltage domain 106 or 104, the MCT output signals 142 and 162 may be level shifted.

At step 408, SCT input signals 150 and 170 are provided based on the MCT output signals 142 and 162 to the source clock trees 120 and 130. At step 410, the source clock trees 120 and 130 generate SCT output signals 152 and 172 based on the SCT input signals 150 and 170.

At step 412, the flip-flops 124 and 134 are clocked by the SCT output signals 152 and 172. In addition, for some embodiments, the SCT output signals 152 and 172 may be provided to a delay controller, such as the delay controller 212 or 312, in order to allow fine-tuning of any remaining delay mismatches.

At step 414, the flip-flops 124 and 134 are able to communicate with each other without timing violations, even though the flip-flops 124 and 134 are in different voltage domains 104 and 106. This is possible because the delays in the signals 152 and clocking the flip-flops 124 and 134, as compared to the original clock signal 110, are essentially the same after passing through a source clock tree 120 or 130 in one voltage domain 104 or and a mirrored clock tree 132 or 122 in the other voltage domain 106 or 104.

Although the present invention has been described with several embodiments, various changes and modifications may be suggested to one skilled in the art. It is intended that the present invention encompass such changes and modifications as fall within the scope of the appended claims.

What is claimed is:

1. A method for balancing clock trees in a multi-voltage synchronous digital environment, comprising:
    generating a first source clock signal in a first voltage domain based on a first mirrored clock signal in a second voltage domain, the first mirrored clock signal generated in the second voltage domain using an original clock signal;
    generating a second source clock signal in the second voltage domain based on a second mirrored clock signal in the first voltage domain, the second mirrored clock signal generated in the first voltage domain using the original clock signal;
    generating a first feedback signal based on the first source clock signal;
    generating a second feedback signal based on the second source clock signal; and
    adjusting at least one of a first delay and a second delay based on the first and second feedback signals, the first delay associated with the first source clock signal and the second delay associated with the second source clock signal.

2. The method of claim 1, wherein the first delay comprises a delay between the original clock signal and the first mirrored clock signal, and the second delay comprises a delay between the original clock signal and the second mirrored clock signal.

3. The method of claim 1, further comprising:
    clocking a first set of flip-flops in the first voltage domain using the first source clock signal; and
    clocking a second set of flip-flops in the second voltage domain using the second source clock signal, the first set of flip-flops operable to communicate with the second set of flip-flops.

4. The method of claim 1, further comprising:
    shifting up voltage levels of a first set of signals from the first voltage domain;
    providing the shifted first set of signals to the second voltage domain;
    shifting down voltage levels of a second set of signals from the second voltage domain; and
    providing the shifted second set of signals to the first voltage domain.

5. The method of claim 1, wherein the first voltage domain comprises an adaptive voltage scaling (AVS) voltage domain, and the second voltage domain comprises a non-AVS voltage domain.

6. The method of claim 4, wherein adjusting at least one of the first delay and the second delay comprises adjusting at least one of the first delay and the second delay based on:
    the first feedback signal that has been (i) shifted up between the first and second voltage domains at least twice and (ii) shifted down between the first and second voltage domains at least twice; and
    the second feedback signal that has been (i) shifted up between the first and second voltage domains at least twice and (ii) shifted down between the first and second voltage domains at least twice.

7. A multi-voltage synchronous digital system operable to provide balanced clock trees, comprising:
    a first voltage domain comprising a first source clock tree;
    a second voltage domain coupled to the first voltage domain, the second voltage domain comprising a second source clock tree, the first source clock tree operable to generate a first source clock signal based on a first mirrored clock signal in the second voltage domain, the second source clock tree operable to generate a second source clock signal based on a second mirrored clock signal in the first voltage domain; and
    a delay controller operable to receive a first feedback signal based on the first source clock signal, to receive a second feedback signal based on the second source clock signal, and to adjust at least one of a first delay and a second delay based on the first and second feedback signals, the first delay associated with the first source clock signal and the second delay associated with the second source clock signal.

8. The system of claim 7, wherein:
    the first voltage domain further comprises a first mirrored clock tree operable to generate the second mirrored clock signal based on an original clock signal, and
    the second voltage domain further comprises a second mirrored clock tree operable to generate the first mirrored clock signal based on the original clock signal.

9. The system of claim 8, further comprising a clock management unit coupled to the first voltage domain and to the second voltage domain, the clock management unit operable to generate the original clock signal.

10. The system of claim 9, wherein the clock management unit comprises a first port and a second port, the clock management unit further operable to provide the original clock signal to the first voltage domain through the first port and to the second voltage domain through the second port.

11. The system of claim 7, wherein:
    the first voltage domain further comprises a first set of flip-flops and the first source clock tree is further operable to clock the first set of flip-flops using the first source clock signal, and
    the second voltage domain further comprises a second set of flip-flops and the second source clock tree is further operable to clock the second set of flip-flops using the second source clock signal.

12. The system of claim 7, wherein the first voltage domain comprises an adaptive voltage scaling (AVS) voltage domain, and the second voltage domain comprises a non-AVS voltage domain.

13. The system of claim 8, wherein:
    the first mirrored clock tree is substantially identical to the first source clock tree; and the second mirrored clock tree is substantially identical to the second source clock tree.

14. A multi-voltage synchronous digital system operable to provide balanced clock trees, comprising:
a first voltage domain comprising a first source clock tree and a first plurality of buffers;
a second voltage domain comprising a second source clock tree and a second plurality of buffers;
the first source clock tree operable to generate a first source clock signal based on a first mirrored clock signal in the second voltage domain;
the second source clock tree operable to generate a second source clock signal based on a second mirrored clock signal in the first voltage domain; and
a plurality of level shifters operable to couple the first voltage domain to the second voltage domain, the level shifters comprising a first set of level shifters and a second set of level shifters, the first set of level shifters operable to shift up voltage levels of a first set of signals from the first voltage domain and to provide the shifted first set of signals to the second voltage domain, and the second set of level shifters operable to shift down voltage levels of a second set of signals from the second voltage domain and to provide the shifted second set of signals to the first voltage domain.

15. The system of claim 14, further comprising:
a clock management unit coupled to the first voltage domain and to the second voltage domain, the clock management unit operable to generate an original clock signal;
wherein the first voltage domain further comprises a first mirrored clock tree operable to generate the second mirrored clock signal based on the original clock signal; and
wherein the second voltage domain further comprises a second mirrored clock tree operable to generate the first mirrored clock signal based on the original clock signal.

16. The system of claim 15, wherein the clock management unit comprises a first port and a second port, the clock management unit further operable to provide the original clock signal to the first voltage domain through the first port and to the second voltage domain through the second port.

17. The system of claim 14, wherein:
the first voltage domain further comprises a first set of flip-flops and the first source clock tree is further operable to clock the first set of flip-flops using the first source clock signal, and
the second voltage domain further comprises a second set of flip-flops and the second source clock tree is further operable to clock the second set of flip-flops using the second source clock signal.

18. The system of claim 14, wherein the first voltage domain comprises an adaptive voltage scaling (AVS) voltage domain, and the second voltage domain comprises a non-AVS voltage domain.

19. The system of claim 14, further comprising a delay controller operable to receive a first feedback signal based on the first source clock signal, to receive a second feedback signal based on the second source clock signal, and to adjust at least one of a first delay and a second delay based on the first and second feedback signals, the first delay associated with the first source clock signal and the second delay associated with the second source clock signal.

20. The system of claim 19, wherein:
the second voltage domain further comprises a first voltage buffer operable to provide the first delay and a second voltage buffer operable to provide the second delay, and
the delay controller is coupled to the first and second voltage buffers and is operable to adjust at least one of the first and second delays by providing a first control signal to the first voltage buffer and a second control signal to the second voltage buffer.

21. The apparatus of claim 7, further comprising a first voltage buffer operable to provide the first delay and a second voltage buffer operable to provide the second delay;
wherein the delay controller is coupled to the first and second voltage buffers and is operable to provide a first control signal to the first voltage buffer and a second control signal to the second voltage buffer.

* * * * *

UNITED STATES PATENT AND TRADEMARK OFFICE
CERTIFICATE OF CORRECTION

PATENT NO. : 7,581,131 B1  Page 1 of 1
APPLICATION NO. : 11/124820
DATED : August 25, 2009
INVENTOR(S) : Prasad et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 877 days.

Signed and Sealed this

Fourteenth Day of September, 2010

David J. Kappos
*Director of the United States Patent and Trademark Office*